Aug. 16, 1966 H. F. DATES 3,266,661
METHOD OF APPLYING ELECTRO-CONDUCTIVE
COATINGS AND RESULTING ARTICLE
Filed Oct. 4, 1961 2 Sheets-Sheet 1

INVENTOR.
HAROLD F. DATES
BY
Clarence R. Patty, Jr.
ATTORNEY

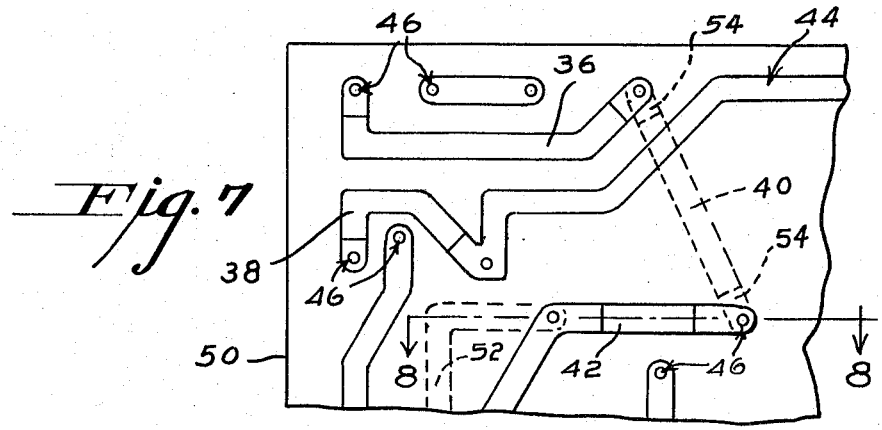
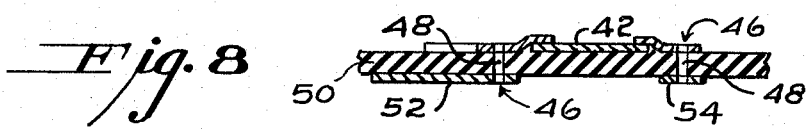
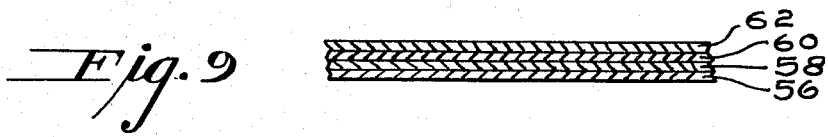
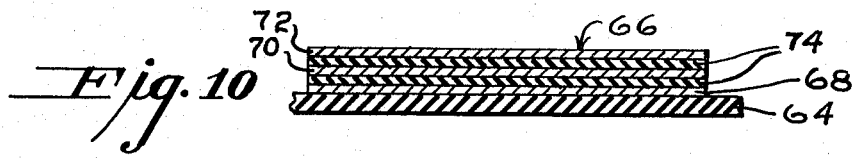
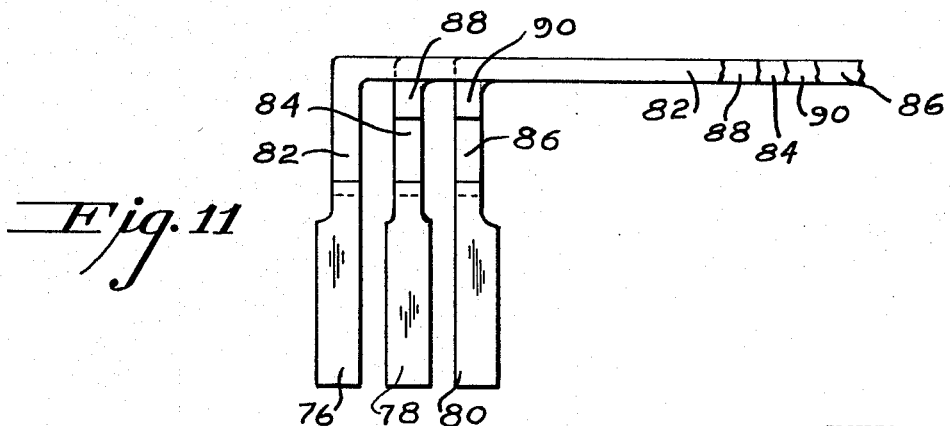

United States Patent Office

3,266,661
Patented August 16, 1966

---

3,266,661
METHOD OF APPLYING ELECTRO-CONDUCTIVE COATINGS AND RESULTING ARTICLE
Harold F. Dates, Corning, N.Y., assignor to Corning Glass Works, Corning, N.Y., a corporation of New York
Filed Oct. 4, 1961, Ser. No. 142,980
11 Claims. (Cl. 220—64)

This invention relates to a method of applying an electro-conductive coating to a substantially non-conductive substrate, and more particularly to applying patterned or unpatterned heating elements, resistive coatings, conductors and the like to non-conductive surfaces, but is in no way limited to such applications.

In the past resistors, heaters, conductors, printed circuits and the like were formed by applying resistive or electro-conductive coatings on glass, ceramics and other non-conductive substrates. These coatings, consisting of metallic and/or metallic oxide compositions have been applied in very thin films by various methods such as sputtering, evaporating, brushing, spraying, stenciling, dipping, silk screening and others. Furthermore, such coatings were applied in either continuous films or various patterns. Patterns are generally used in applications such as resistors, heaters and printed circuits where it is necessary to provide desired conductive or resistive paths. In such applications the coating is applied either in pattern form by silk screening or the like, or in a continuous film upon a surface where a "resist" (a substance preventing adhesion of the coating to the substrate) has been applied to the areas where the coating is not required, followed by the removal of the coating and "resist" from said areas leaving the desired pattern. A continuous coating may also be applied where a "resist" is not used, by removing the coating from areas where it is not required by other means.

The coatings are composed, in various combinations and degrees, of noble or non-noble metals, metal oxides, conductive, semi-conductive or non-conductive fillers, opacifiers, fluxes and vehicles or carriers of various types. The compositions are varied to produce desired results. For example, metals are used where low resistances are desired while metal oxides are used where high resistances are desired. These characteristics are further modified by changing the quantity of metal or metal oxides and/or by combining them with fillers which are more or less conductive or non-conductive. In addition, the resistance is varied by the length of the coating path as well as its thickness. In most applications the coating thickness varies from slightly greater than the molecular size of the material to several thousandths of an inch, depending on the resistance required. Such coatings are generally applied to the non-conductive substrate as a viscous mixture and are bonded or fused to the substrate by subsequent air drying and kiln firing.

It has been found difficult to economically apply coatings of uniform thickness to uneven, shaped or curved surfaces. Surfaces having variations of 1/32″ or more, do not lend themselves to the application of uniform thickness coatings by the methods heretofore noted. Since the coating resistance is a function of the thickness and the coating thickness is ordinarily very thin, small variations in the thickness may substantially affect the resistance. This problem becomes acute in heater applications, where comparatively small thickness variations cause "hot spots" (areas of heat concentration) and subsequent coating decay or burnout. Variations in thickness greater than about 15% make the coating unsuitable for such applications. This problem has necessitated costly and laborious grinding operations on a substrate to provide a smooth, even substrate surface for the application of said patterned coating.

It is, therefore, the specific object of this invention to provide a method for the application of electro-conductive or resistive coatings, patterned or unpatterned, having a uniform thickness and resistance to surfaces of vitreous or other non-conducting material which are flat, shaped, curved or have irregularities.

It is another object of this invention to provide an improved method for the application of electro-conductive or resistive coatings, for use as resistors, heater elements, conductors, printed circuits and the like.

A further object is to provide an improved method for the construction of heater elements, formed of a resistive coating on a non-conductive substrate, whereby areas of heat concentration will be eliminated.

Still another object of this invention is to provide a method of applying electro-conductive and/or resistive coatings, patterned or unpatterned, wherein the coating at least in part is composed of at least two layers with each layer or combination of layers varying in resistive composition, while a uniform thickness of each layer is maintained.

A still further object is to provide a method of applying electro-conductive or resistive coatings, wherein the coating is composed of at least two layers with each layer or combination of layers varying in resistive composition, while a uniform thickness of each layer is maintained, where the pattern of each layer may or may not be coincident with the pattern of any other layer permitting construction of complex resistive and/or conductive systems.

A still further object is to provide a method for manufacturing printed circuit boards having resistor patterns of varying resistive values incorporated with conductive patterns.

Another object is to provide a method for manufacturing heater elements using conductive and resistive coatings whereby the resistive coating can be terminated and the conductive coating can be continued with positive electrical contact between them.

Additional objects, features and advantages of the present invention will become apparent, to those skilled in the art, from the following detailed description and the attached drawings, in which, by way of example, only the preferred embodiments of this invention are illustrated. I have found that such objects can be achieved by forming a water slide-off or hot transfer decalcomania, where the transferable portion comprises an electro-conductive coating and a suitable film carrier, said coating comprising at least one layer of at least one composition, each of said layers having a substantially uniform thickness with variation in thickness being not greater than about 15%, transferring the electro-conductive coating and carrier to a non-conductive substrate, thereafter bonding or fusing the coating to said substrate through firing, during which firing said film carrier and all organic constituents of said coating are volatilized leaving a firmly adhered conductive and/or resistive element on said substrate.

FIG. 7 is a fragmentary plan view of printed electrical circuit where resistive elements are incorporated within the conductive pattern.

FIG. 8 is a cross section through 8—8 of FIG. 7 showing resistive and conductive elements in place.

FIG. 9 is a cross section of a typical hot-transfer decalcomania.

FIG. 10 is a cross section of a stack of independent heaters.

FIG. 11 is a fragmentary plan view of individual heater contact plates for a stack of heaters such as shown in FIG. 10.

Any known electro-conductive coating material, which may be formed as a viscous mixture, is suitable for the present purpose. By electro-conductive coating is meant thin coatings or films generally composed of varying combinations of noble or non-noble metals, metal oxides, fillers, opacifiers, fluxes, and moistening agents. The various compositions yield coatings of varying resistive values. Coatings having low or negligible resistance are termed conductive coatings, while those of greater resistance are termed resistive coatings. Innumerable combinations of materials may be used in forming an electro-conductive coating within the scope of this invention and no particular combination of materials forms a part of this invention.

Figure 1:
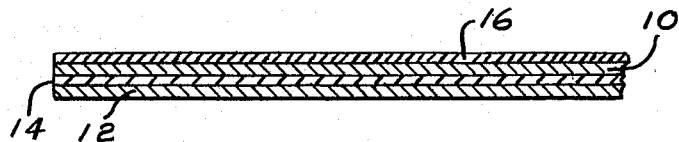
FIG. 1 is a cross section of a typical water slide-off decalcomania.

A preferred embodiment of this invention is illustrated by FIG. 1 of the drawing which shows a water slide-off decalcomania. An electro-conductive coating 10, is applied by silk screening, or other method capable of depositing a uniform thickness of material, to a decalcomania paper comprising backing paper 12, and a film of water soluble gum 14. The composition of the water soluble gum 14 is not critical and may be any water soluble gum, for example, such as is generally supplied as a coating on commercially available water slide-off decalcomania paper. A substantially water insoluble film 16, of lacquer or the like is applied to the said electro-conductive coating to form the carrier for the coating. The lacquer should be of a free burning type which burns off and/or volatilizes evenly without disturbing the electro-conductive composition particles. One familiar with the art can readily select a suitable lacquer. A decalcomania paper is used because it is inexpensive and readily available although any temporary, flexible backing from which a subsequently applied electro-conductive coating is readily separable, is equally suitable for the present purposes. It is important to note that a flexible backing such as a decalcomania paper may be held under positive parallel surface conditions while the electro-conductive coating is applied. (Positive parallel surface conditions are those under which the flexible backing may be held flat and parallel to the means applying the electro-conductive coating.) Under such conditions an electro-conductive coating having thickness variations not greater than about 15% may be readily applied and as a practical matter it has been found that coatings having thickness variations of less than 2 percent may be easily applied by silk screening or the like. Thereafter, an electro-conductive coating having a uniform thickness can be transferred to a substrate regardless of its surface curvature, shape or unevenness, where application of a uniformly thick electro-conductive coating could not be accomplished directly.

After forming a decalcomania as described above, the electro-conductive coating with its vehicle or carrier is transferred to a non-conductive substrate material such as a ceramic cooking or warming utensil, printed circuit board, heater element board, switch panel, variable resistor element base, and the like. Almost any article using resistive or conductive elements can be formed. The substrate with its electro-conductive coating is then fired in a kiln or the like resulting in the decomposition and volatilization of the composition organic materials, if any, as well as the coating carrier, leaving the substrate with a firmly bonded or fused electro-conductive coating.

The firing is accomplished in the normal manner, by placing the substrate with the electro-conductive coating applied, in a furnace or kiln and heating it at a rate which is slow enough to prevent breakage or damage to the substrate and which permits even volatilization and decomposition of the fluxes, binders and coating vehicle, while heating to a temperature high enough to cause bonding and/or fusion of the electro-conductive coating to the substrate. While the heating rates and fusion or bonding temperatures are dependent upon both the materials utilized and the shape and size of the substrate, they are not critical conditions and suitable conditions can be readily determined by one skilled in the art of firing electro-conductive coatings.

Figure 2:
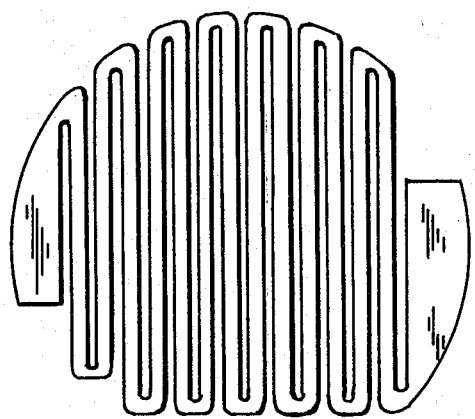
FIGS. 2 and 3 are plan views illustrating examples of different configurations or patterns of heating elements which may be applied to articles by the means and method of this invention.
Figure 3:
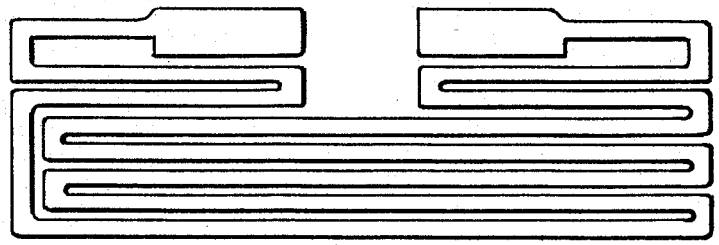

FIG. 2 is an illustration of one type of heating element, formed in accordance with the method of this invention, suitable for use as a heating element on a warming dish. FIG. 3 is an illustration of a differently shaped heating element, suitable for use on a dish warmer.

Figure 4:
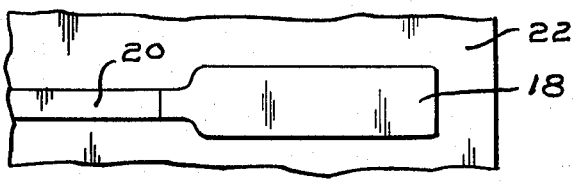
FIG. 4 is a fragmentary plan view of a heater element and heater contact plate formed of different compositions.
Figure 5:
FIGS. 5 and 6 are cross sections illustrating different arrangements of heater elements and heater contact plates, having different compositions.
Figure 6:

Certain applications require coatings having comparatively high resistance. When high resistance coatings are utilized it sometimes becomes a problem to make good electrical contact between such coatings and the electrical conductor leading thereto. It is therefore, desirable to have a low resistance or a purely conductive coating at the said point of contact. FIG. 4 illustrates a contact plate 18, composed of a conductive material superimposed wholly or in part on the resistive coating 20, and the combination bonded or fused to each other and the substrate 22. FIG. 5 illustrates a contact plate 24 partly superimposed on resistive coating 26 and bonded or fused to both the resistive coating and the substrate 28. FIG. 6 illustrates a contact plate 30 wholly superimposed on the resistive coating 32 and bonded or fused to said resistive coating which in turn is bonded or fused to substrate 34. Articles, wherein contact plates are composed of a material other than the material of the resistive element such as illustrated in FIGS. 4, 5 and 6, are made by forming a desired resistive pattern on decalcomania paper, as heretofore described, thereafter repeating the process using a contact plate pattern and a more conductive coating material, thereby forming the contact plates of this more conductive coating material in the areas where the contact plates are desired. For example, a desired resistive pattern is first silk screened onto a decalcomania paper utilizing suitable resistive material. After the resistive pattern has dried, the contact plates are silk-screened at the desired places using a more conductive material and the decalcomania is then completed as heretofore described. When the resistive coating and contact plates are subsequently fired they fuse together well, yielding good electrical continuity. The bonding to the substrate is no different than when one material is used. Whether the contact plate is wholly or partly superimposed on the resistive material is a matter of choice and unimportant as long as there is sufficient superimposition to obtain good electrical contact.

FIGS. 7 and 8 illustrate a printed circuit board wherein resistances 36, 39, 40 and 42 are incorporated within a conductive pattern generally indicated by 44. Terminal points 46, are provided at desired positions for subsequent connection of other components. Terminal points 46 may be formed around holes 48 to facilitate connection from either side of the printed circuit board 50, however this is a matter of choice and is not necessary. A circuit may be printed on both sides of the printed circuit board 50, as illustrated by conductive element 52 and resistor 40, which resistor is connected to the remainder of the circuit by conductive elements 54, all of which components are shown on the under side of the said board.

A printed circuit board is made by first prepunching or otherwise providing terminal point holes in the substrate where and if desired. Thereafter, one or two decalcomanias, depending on whether the circuit will be formed on one or both sides of the substrate, having resistive and conductive elements in the desired positions, are prepared in accordance with the method heretofore described. The entire circuit for each side of the printed circuit board is then slid off the decalcomania backing paper, after suitable water soaking in the case of a water slide-off decalcomania or suitable heating in the case of a hot transfer decalcomania, and positioned on the said circuit board at one time. The formed printed circuit board is then suitably fired to remove by volatilization all organic materials, binders, carriers and the like and to fuse or bond the printed circuit to the substrate. Where terminal point holes are provided they may be left as such, allowing the component connection wires to be later passed through and attached at one or both sides of the circuit board or the holes may be lined with a suitable metallic object, such as a rivet or the like, not illustrated, thereby making an immediate mechanical connection between both sides of the said circuit board. Since the terminal points and/or terminal point holes are a matter of designer's choice and are not part of the present invention as such, note is made of them herein merely to illustrate some of the variations possible.

FIG. 9 illustrates a hot-transfer decalcomania which is formed in a manner similar to the water slide-off decalcomania illustrated in FIG. 1. It varies in that the decalcomania backing paper 56, is coated with a low melting temperature wax 58, to which a film 60, of lacquer is applied to form the carrier. The electro-conductive coating 62, is thereafter applied to said film of lacquer. Commercially available hot-transfer decalcomania paper is supplied with a suitable wax coating. Although the lacquer composition is not critical, it should have a volatilization temperature higher than the melting point of said wax. Nitro cellulose and the like has been found to be suitable lacquer material. Upon applying the formed decalcomania, preferably under pressure, to a suitably heated substrate, the said wax softens permitting the backing paper to be removed. Although pressure is not necessary for the application of the decalcomania, pressures ranging from 200 to 1000 p.s.i. provide a more uniform and even release of the transferable portion. The carrier and the composition organic materials, in addition to any of said wax remaining on the surface, are removed through volatilization during firing, leaving the electro-conductive coating bonded or fused to the substrate.

FIG. 10 illustrates still another embodiment of the present invention. A heater unit having more than one heating element can be made by fusing or bonding to substrate 64, a laminated structure indicated generally by 66, comprising layers of resistance material forming heating elements 68, 70, and 72, said heating elements being separated one from another by layers of electric insulating material 74. Such a laminated structure is prepared by forming a decalcomania, in accordance with the methods heretofore described, by applying alternate layers of resistive and insulating materials to the backing paper. The composition of the resistive material for each heating element may be different, thereby permitting the production of a heater unit having heating elements of varying resistances and consequently providing various degrees of heating. The formed laminated structure may then be transferred to the substrate and fired as heretofore described. The patterns of the heating elements may be coincident with one another, however, the contact plates should be positioned apart from one another. A typical contact plate arrangement for a heater unit having more than one heating element is illustrated in FIG. 11. Contact plates 76, 78 and 80 are individually fused to heating elements 82, 84 and 86, which heating elements are separated one from another by insulating material 88 and 90.

A typical example of one method of carrying out the present invention is illustrated by the following description. A resistive coating composition was prepared, comprising by weight about 35.0% silver flakes, 8.5% tin-antimony oxide, 12.5% finely divided glass and 44.0% ethyl cellulose vehicle. The tin-antimony oxide has a mixture of about 79% by weight $SnO_2$ and 21% by weight $Sb_2O_3$. A silk screen was prepared having a suitable heating element pattern and thereafter a decalcomania was formed by printing said heating element pattern with said resistive coating composition on an ordinary commercially available water slide-off decalcomania paper having a film of suitable water soluble gum applied to its printing surface, while the decalcomania paper was maintained flat and parallel to the silk screen. After the composition was air dried a coating of nitro cellulose lacquer was applied to the surface and also allowed to air dry. Thereafter the decalcomania was soaked in water until the water soluble gum was softened. The printed resistive coating with its lacquer film carrier was then removed from the paper backing and positioned on the bottom of a glass warming dish. After the excess water was removed by a "squeegee," the coating and carrier were dried at a temperature of 70° C. This assembly was then fired by placing it on a conveyor and passing it through a temperature zoned kiln, which zones were maintained at 400° C., 535° C. and 735° C. Approximately 4 minutes were required for the assembly to pass through each zone and it was heated at the rate of about 65° C. per minute in the 400° C. and 735° C. zones and about 70° C. per minute in the 535° C. zone. During this firing the assembly reached a temperature of about 730° C. and the organic lacquer carrier as well as all of the composition organic materials were volatilized and the glass flux devitrified. The assembly was then subjected to pressurized streams of air for a short time and thereafter allowed to air cool.

The contact plates of the heater in this example were composed of the same material as the heating element itself since the electrical resistance of the composition was low and good contact with the lead-in wires could be effected.

Although the present invention has been described with respect to specific detail of certain embodiments thereof, it is not intended that such details be limitations upon the scope of the invention except insofar as set forth in the following claims.

What is claimed is:

1. A decalcomania for transferring an electro-conductive coating to a substantially non-conductive substrate comprising a backing paper having a water soluble gum applied to its surface, an electro-conductive coating and a substantially water insoluble film, said coating comprising a mixture of finely divided metal, metallic oxide, and glass, being disposed between said water soluble gum and said insoluble film and having thickness variations not greater than about 15%.

2. The decalcomania of claim 1 wherein said coating comprises a mixture of silver flakes, tin-antimony oxide, and finely divided glass.

3. A decalcomania for transferring an electro-conductive coating to a substantially non-conductive substrate comprising a backing paper having a film of low melting temperature wax applied to its surface, an electro-conductive coating and a film of material having a volatilization temperature higher than the melting point of said wax, said film being disposed between said wax and said coating, and said coating comprising a mixture of finely divided metal, metallic oxide, and glass having thickness variations not greater than about 15%.

4. The decalcomania of claim 3 wherein said coating comprises a mixture of silver flakes, tin-antimony oxide, and finely divided glass.

5. The method of applying a heating element to a rigid electrically non-conductive substrate formed of material selected from the group consisting of glass and ceramic comprising the steps of providing a temporary backing, applying a layer of a first electro-conductive material to said backing in a predetermined shape and having thickness variations less than about 15%, said layer comprising said heating element, applying a second electro-conductive material having a higher electrical conductivity than said first electro-conductive material to portions of said layer and in electrical contact therewith to form contact plates for said heating element, transferring said layer and said contact plates from said temporary backing to a surface of said substrate, heating the thus formed article to a temperature sufficient to fuse said first electro-conductive material to said substrate and fuse said second electro-conductive material to said first material, and thereafter cooling said article.

6. The method of applying an electro-conductive coating to a rigid substantially non-conductive substrate formed of material selected from the group consisting of glass and ceramic having an uneven surface comprising the steps of providing a flexible, sheet-like temporary backing, supporting said backing so that its surface is flat and even, applying to said backing an electro-conductive layer of a predetermined pattern having thickness variations less than about 15%, transferring said electro-conductive layer directly to said surface of said substrate, heating the thus formed article to a temperature sufficient to fuse said layer to said substrate surface, and thereafter cooling said article.

7. The method of applying a heating element to a substantially uneven surface of a warming utensil comprising the steps of providing a utensil formed of material selected from the group consisting of glass and ceramic, providing a sheet-like temporary backing, supporting said backing so that its surface is flat and even, applying to said backing an electro-conductive layer of a predetermined pattern comprising a mixture of finely divided particles of a metal, metallic oxide and glass and having thickness variations of less than about 15%, said electro-conductive layer comprising said heating element, transferring said electro-conductive layer directly to said surface of said utensil, heating the thus formed article to a temperature sufficient to fuse said electro-conductive layer to said utensil surface, and thereafter cooling said article.

8. The method of applying a plurality of heating elements to a substantially uneven surface of a warming utensil comprising the steps of providing a utensil formed of material selected from the group consisting of glass and ceramic, providing a sheet-like temporary backing, supporting said backing so that its surface is flat and even, applying to said backing a first layer of an electro-conductive material of a predetermined pattern comprising a mixture of finely divided particles of a metal, metallic oxide and glass, applying a layer of an electrically non-conductive material to a portion of said first layer, applying a second layer of an electro-conductive material of a predetermined pattern to said layer of non-conductive material whereby at least a portion of said layers are in a stacked relationship with each other, said layers of electro-conductive materials comprising said heating elements and having thickness variations less than about 15%, transferring said layers as a unit from said backing directly to said surface of said utensil, heating the thus formed article to a temperature sufficient to fuse said layers to each other and to said utensil surface, and thereafter cooling said article.

9. The method of claim 8 further comprising the steps of applying an electro-conductive material having a higher electrical conductivity than said electro-conductive materials of said heating elements to portions of said first and second layers to form contact plates for said heating elements.

10. The method of making a warming utensil comprising the steps of providing a utensil formed of material selected from the group consisting of glass and ceramic, providing a temporary backing, applying to said backing an electro-conductive coating of a predetermined pattern having thickness variations of less than about 15%, comprising by weight a mixture of 35% silver flakes, 8.5% tin-antimony oxide, 12.5% finely divided glass, and 44% ethyl cellulose, the tin-antimony oxide being a mixture of about 79% by weight $SnO_2$ and about 21% by weight $Sb_2O_3$, applying an organic carrier to said coating, transferring said coating and said carrier to the bottom of said utensil, heating said utensil to a temperature of up to 735° C. thereby volatilizing all of the organic constituents and fusing the electro-conductive coating to said utensil, and thereafter cooling said utensil.

11. A warming utensil comprising a container formed of material selected from the group consisting of glass and ceramic, and an electro-conductive coating fused to the bottom of said container having thickness variations of less than about 15% comprising by weight a mixture of about 35 parts silver flakes, 8.5 parts tin-antimony oxide, 12.5 parts finely divided glass, the tin-antimony oxide being a mixture of about 79% by weight $SnO_2$ and 21% by weight $Sb_2O_3$.

References Cited by the Examiner

UNITED STATES PATENTS

| 2,629,679 | 2/1953 | Rathke | 156—89 |
| 2,704,105 | 3/1655 | Robinson et al. | 161—189 |
| 2,711,983 | 6/1955 | Hoyt. | |
| 2,724,674 | 11/1955 | Pritikin | 156—89 |
| 2,776,235 | 1/1957 | Peck | 156—234 |
| 2,970,076 | 1/1961 | Porth | 156—89 |
| 2,984,595 | 5/1961 | Schumpelt et al. | 156—240 |

EARL M. BERGERT, *Primary Examiner.*

R. L. SMITH, M. L. KATZ, *Assistant Examiners.*